US012624572B2

(12) United States Patent
Wu

(10) Patent No.: US 12,624,572 B2
(45) Date of Patent: May 12, 2026

(54) LOCK CAPABLE OF SHOWING LOCKING OR UNLOCKING STATE

(71) Applicant: I-TEK METAL MFG. CO., LTD, Tainan (TW)

(72) Inventor: Chang-Ren Wu, Tainan (TW)

(73) Assignee: I-TEK METAL MFG. CO., LTD., Tainan (TW)

( * ) Notice: Subject to any disclaimer, the term of this patent is extended or adjusted under 35 U.S.C. 154(b) by 73 days.

(21) Appl. No.: 18/815,776

(22) Filed: Aug. 26, 2024

(65) Prior Publication Data

US 2026/0055637 A1 Feb. 26, 2026

(51) Int. Cl.
*E05B 41/00* (2006.01)
*E05B 55/00* (2006.01)

(52) U.S. Cl.
CPC .............. *E05B 41/00* (2013.01); *E05B 55/00* (2013.01)

(58) Field of Classification Search
CPC .... E05B 41/00; E05B 55/00; Y10T 292/1039; Y10T 292/104; Y10T 292/1041; Y10T 292/1043; Y10T 292/1075; Y10T 292/1077
See application file for complete search history.

(56) References Cited

U.S. PATENT DOCUMENTS

| | | | |
|---|---|---|---|
| 1,643,932 | A | 9/1927 | Teich |
| 1,687,009 | A | 10/1928 | Drexler et al. |
| 2,820,241 | A | 1/1958 | Schlage |
| 4,102,005 | A | 7/1978 | Schnarr et al. |
| 4,107,877 | A | 8/1978 | Lee |
| 4,267,619 | A | 5/1981 | Suska |
| 4,348,835 | A | 9/1982 | Jones et al. |
| 4,419,787 | A | 12/1983 | Lieberman |
| 4,501,090 | A | 2/1985 | Yoshida et al. |
| 4,628,636 | A | 12/1986 | Folger |
| 4,867,496 | A | 9/1989 | Thomas |
| 5,040,331 | A | 8/1991 | Merendino et al. |
| 5,782,509 | A | 7/1998 | Uyeda |
| 6,177,771 | B1 | 1/2001 | Kinzer et al. |

(Continued)

FOREIGN PATENT DOCUMENTS

| | | | |
|---|---|---|---|
| AU | 2014339759 | B2 | 5/2018 |
| CN | 110424823 | A | 11/2019 |

(Continued)

*Primary Examiner* — Christine M Mills
*Assistant Examiner* — Yahya Sidky
(74) *Attorney, Agent, or Firm* — Che-Yang Chen; Law Office of Michael Chen

(57) ABSTRACT

A lock capable of showing a locking state or an unlocking state comprises a latch device and an operating device for moving a latch from a latching position and an unlatching position. The operating device includes a window and an indicating member movable relative to the window. The indicating member includes a locking indication and an unlocking indication. A locking operation mechanism of the operating member may be operated to move the indicating member to a position in which the locking indication is aligned with the window and the operating device is unable to move the latch to the unlatching position or another position in which the unlocking indication is aligned with the window and the operating device is operable to move the latch to the unlatching position.

9 Claims, 7 Drawing Sheets

(56) References Cited

U.S. PATENT DOCUMENTS

| | | | |
|---|---|---|---|
| 6,454,324 | B1 | 9/2002 | Lewis et al. |
| 6,553,717 | B2 | 4/2003 | St. John et al. |
| 6,622,535 | B2 | 9/2003 | Chiang et al. |
| 6,634,140 | B1 | 10/2003 | Sellman |
| 6,732,557 | B1 | 5/2004 | Zehrung |
| 6,745,603 | B1 | 6/2004 | Shaw |
| 6,786,006 | B2 | 9/2004 | Kowalczyk et al. |
| 6,891,479 | B1 | 5/2005 | Eccleston |
| 6,978,646 | B2 | 12/2005 | Raatikainen |
| 7,051,403 | B2 | 5/2006 | Homberg |
| 7,061,197 | B1 | 6/2006 | Mullet et al. |
| 7,068,179 | B2 | 6/2006 | Snell et al. |
| 7,143,547 | B2 | 12/2006 | Liles, Jr. |
| 7,234,201 | B2 | 6/2007 | Brown et al. |
| 7,240,524 | B1 | 7/2007 | White et al. |
| 7,282,883 | B2 | 10/2007 | Mullet et al. |
| 7,296,380 | B2 | 11/2007 | Backman |
| 7,316,096 | B2 | 1/2008 | Houser et al. |
| 7,418,800 | B1 | 9/2008 | Sellman |
| 7,484,333 | B2 | 2/2009 | Houser et al. |
| 7,555,867 | B2 | 7/2009 | Liles, Jr. |
| 7,634,927 | B1 | 12/2009 | Tien |
| 7,717,155 | B2 | 5/2010 | Mullet |
| 7,774,984 | B2 | 8/2010 | Hsu |
| 8,109,038 | B2 | 2/2012 | Houser et al. |
| 8,169,169 | B2 | 5/2012 | Hass et al. |
| 8,201,858 | B1 | 6/2012 | Moon et al. |
| 8,225,458 | B1 | 7/2012 | Hoffberg |
| 8,248,005 | B2 | 8/2012 | Romer |
| 8,359,790 | B2 | 1/2013 | Shin |
| 8,382,008 | B1 | 2/2013 | Ricciardi et al. |
| 8,390,219 | B2 | 3/2013 | Houser |
| 8,393,054 | B2 | 3/2013 | Bienek |
| 8,407,937 | B2 | 4/2013 | Houser |
| 8,415,902 | B2 | 4/2013 | Burris et al. |
| 8,434,268 | B2 | 5/2013 | Nixon |
| 8,499,495 | B2 | 8/2013 | Houser et al. |
| 8,523,248 | B2 | 9/2013 | Tien |
| 8,540,290 | B2 | 9/2013 | Chen |
| 8,547,046 | B2 | 10/2013 | Burris et al. |
| 8,601,744 | B2 | 12/2013 | Wildforster et al. |
| 8,695,277 | B2 | 4/2014 | Romer et al. |
| 8,773,237 | B2 | 7/2014 | Burris et al. |
| 8,826,598 | B2 | 9/2014 | Ranaudo et al. |
| 8,875,344 | B2 | 11/2014 | Salutzki et al. |
| 8,904,710 | B2 | 12/2014 | Romer et al. |
| 8,963,683 | B2 | 2/2015 | Romer |
| 9,003,630 | B2 | 4/2015 | Hufen |
| 9,045,927 | B1 | 6/2015 | Hoffberg |
| 9,097,051 | B2 | 8/2015 | Hellwig |
| 9,115,526 | B2 | 8/2015 | Houser et al. |
| 9,121,217 | B1 | 9/2015 | Hoffberg |
| 9,163,446 | B2 | 10/2015 | Houser et al. |
| 9,181,744 | B2 | 11/2015 | Salutzki et al. |
| 9,187,942 | B2 | 11/2015 | Wildforster |
| 9,297,194 | B2 | 3/2016 | Bienek et al. |
| 9,506,284 | B2 | 11/2016 | Braverman et al. |
| 9,514,583 | B2 | 12/2016 | Zasowski et al. |
| 9,631,412 | B2 | 4/2017 | Hellwig et al. |
| 9,683,378 | B2 | 6/2017 | Houser et al. |
| 9,695,620 | B2 | 7/2017 | Zasowski et al. |
| 9,830,932 | B1 | 11/2017 | Gunderson et al. |
| 9,869,117 | B2 | 1/2018 | Houser et al. |
| 9,886,831 | B1 | 2/2018 | Svoboda et al. |
| 9,995,076 | B1 | 6/2018 | Hoffberg |
| 10,006,236 | B2 | 6/2018 | Hellwig et al. |
| 10,024,094 | B2 | 7/2018 | Bell et al. |
| 10,030,425 | B2 | 7/2018 | Zasowski et al. |
| 10,030,426 | B2 | 7/2018 | Langenberg |
| 10,077,591 | B2 | 9/2018 | Hass |
| 10,180,023 | B2 | 1/2019 | Zasowski et al. |
| 10,208,520 | B2 | 2/2019 | Long et al. |
| 10,236,801 | B2 | 3/2019 | Dye et al. |
| 10,253,540 | B2 | 4/2019 | Bell et al. |
| 10,273,736 | B2 | 4/2019 | Hucker |
| 10,280,670 | B2 | 5/2019 | Roberts |
| 10,280,678 | B1 | 5/2019 | Rendon, Jr. et al. |
| 10,304,272 | B2 | 5/2019 | Kvinge et al. |
| 10,316,568 | B2 | 6/2019 | Langenberg et al. |
| 10,344,502 | B2 | 7/2019 | McKibben et al. |
| 10,415,301 | B2 | 9/2019 | Kuan |
| 10,458,151 | B1 | 10/2019 | Shen |
| 10,472,873 | B2 | 11/2019 | Ladha et al. |
| 10,480,238 | B1 | 11/2019 | La Force |
| 10,559,151 | B2 | 2/2020 | Kvinge et al. |
| 10,648,198 | B1 | 5/2020 | Shen |
| 10,648,208 | B2 | 5/2020 | Eickhoff |
| 10,704,310 | B1 | 7/2020 | Barbon et al. |
| 10,704,313 | B2 | 7/2020 | Houser et al. |
| 10,724,288 | B2 | 7/2020 | Baumgarte |
| 10,844,644 | B2 | 11/2020 | Langenberg et al. |
| 10,968,677 | B2 | 4/2021 | Hass |
| 11,002,055 | B2 | 5/2021 | Eickhoff et al. |
| 11,124,997 | B2 | 9/2021 | Eickhoff |
| 11,187,022 | B1 | 11/2021 | Hoffberg |
| 11,250,655 | B2 | 2/2022 | Shen |
| 11,282,065 | B2 | 3/2022 | Liu |
| 11,312,207 | B1 | 4/2022 | Sanders et al. |
| 11,417,200 | B2 | 8/2022 | Hass et al. |
| 11,542,727 | B2 | 1/2023 | Hsu |
| 11,544,979 | B1 | 1/2023 | Shen |
| 11,606,681 | B2 | 3/2023 | Shen |
| 11,629,527 | B2 | 4/2023 | Hsu |
| 11,629,544 | B1 | 4/2023 | Tien |
| 11,631,292 | B2 | 4/2023 | Shen |
| 11,661,782 | B2 | 5/2023 | Eickhoff et al. |
| 11,727,770 | B2 | 8/2023 | Shen et al. |
| 11,753,848 | B2 | 9/2023 | Tien |
| 11,756,355 | B2 | 9/2023 | Shen |
| 11,795,751 | B2 | 10/2023 | Tien |
| 11,798,330 | B2 | 10/2023 | Shen |
| 11,814,876 | B2 | 11/2023 | Huang |
| 11,828,097 | B1 | 11/2023 | Tien |
| 2002/0026750 | A1 | 3/2002 | St. John et al. |
| 2002/0178655 | A1 | 12/2002 | Pedemonte |
| 2003/0127869 | A1 | 7/2003 | Herron et al. |
| 2003/0187805 | A1 | 10/2003 | Shen |
| 2003/0204935 | A1 | 11/2003 | Kim |
| 2005/0154612 | A1 | 7/2005 | Smith et al. |
| 2006/0244271 | A1 | 11/2006 | Hass |
| 2006/0261675 | A1 | 11/2006 | Unno |
| 2007/0022664 | A1 | 2/2007 | Mahonen et al. |
| 2007/0114800 | A1 | 5/2007 | Kuo |
| 2007/0256362 | A1 | 11/2007 | Hansen |
| 2007/0268132 | A1 | 11/2007 | Milo |
| 2008/0011030 | A1 | 1/2008 | Ferreira Sanchez et al. |
| 2009/0265992 | A1 | 10/2009 | Hass et al. |
| 2010/0107495 | A1 | 5/2010 | Bourgeois et al. |
| 2010/0315229 | A1 | 12/2010 | Shin |
| 2011/0094160 | A1 | 4/2011 | Houser |
| 2011/0252597 | A1 | 10/2011 | Burris et al. |
| 2011/0302841 | A1 | 12/2011 | Ye et al. |
| 2012/0029701 | A1 | 2/2012 | Houser |
| 2012/0159852 | A1 | 6/2012 | Houser et al. |
| 2012/0190325 | A1 | 7/2012 | Abu-Hakima et al. |
| 2013/0009785 | A1 | 1/2013 | Finn et al. |
| 2013/0216438 | A1 | 8/2013 | Hill et al. |
| 2013/0308778 | A1 | 11/2013 | Fosmark et al. |
| 2013/0346333 | A1 | 12/2013 | Hassler et al. |
| 2014/0026627 | A1 | 1/2014 | Rai et al. |
| 2014/0068755 | A1 | 3/2014 | King et al. |
| 2014/0165329 | A1 | 6/2014 | Wildförster |
| 2014/0255252 | A1 | 9/2014 | Stratman et al. |
| 2014/0282934 | A1 | 9/2014 | Miasnik et al. |
| 2014/0325911 | A1 | 11/2014 | Hass |
| 2015/0070166 | A1 | 3/2015 | Boyden et al. |
| 2015/0113876 | A1 | 4/2015 | Burris et al. |
| 2015/0194033 | A1 | 7/2015 | Esposito et al. |
| 2015/0211278 | A1 | 7/2015 | Moyer et al. |
| 2015/0262438 | A1 | 9/2015 | Zasowski et al. |
| 2015/0339913 | A1 | 11/2015 | Lyman et al. |
| 2016/0153213 | A1 | 6/2016 | Huang |
| 2016/0160530 | A1 | 6/2016 | Shen |
| 2016/0220716 | A1 | 8/2016 | Childress et al. |

(56) References Cited

U.S. PATENT DOCUMENTS

| | | | |
|---|---|---|---|
| 2016/0258189 A1 | 9/2016 | Frolov | |
| 2016/0312514 A1 | 10/2016 | Leonard et al. | |
| 2016/0348415 A1 | 12/2016 | Baumgarte | |
| 2016/0368455 A1 | 12/2016 | Kim et al. | |
| 2017/0275912 A1 | 9/2017 | Murphy | |
| 2017/0275921 A1 | 9/2017 | Murphy et al. | |
| 2017/0306668 A1 | 10/2017 | Li et al. | |
| 2017/0328100 A1 | 11/2017 | Eickhoff | |
| 2018/0158053 A1 | 6/2018 | Adams et al. | |
| 2018/0209185 A1* | 7/2018 | Long | B64D 11/02 |
| 2018/0223577 A1 | 8/2018 | Hucker | |
| 2018/0285547 A1 | 10/2018 | Tsou | |
| 2018/0334841 A1 | 11/2018 | Langenberg et al. | |
| 2018/0334845 A1 | 11/2018 | Hass | |
| 2019/0043289 A1 | 2/2019 | Cahill | |
| 2019/0043296 A1 | 2/2019 | Baumgarte et al. | |
| 2019/0145138 A1 | 5/2019 | Eickhoff | |
| 2019/0153764 A1 | 5/2019 | Baumgarte | |
| 2019/0203503 A1 | 7/2019 | Chang | |
| 2019/0264486 A1 | 8/2019 | Toloday et al. | |
| 2019/0319557 A1 | 10/2019 | Dye et al. | |
| 2019/0338576 A1 | 11/2019 | Wang | |
| 2019/0345738 A1 | 11/2019 | McKibben et al. | |
| 2019/0376316 A1 | 12/2019 | Hsu | |
| 2019/0376317 A1 | 12/2019 | Hsu | |
| 2019/0383080 A1 | 12/2019 | Barbon et al. | |
| 2020/0032554 A1* | 1/2020 | Berger | E05B 9/02 |
| 2020/0037142 A1 | 1/2020 | Lofton | |
| 2020/0190885 A1 | 6/2020 | Coleman | |
| 2020/0211362 A1 | 7/2020 | Shen | |
| 2020/0256108 A1 | 8/2020 | Shetty et al. | |
| 2020/0327758 A1 | 10/2020 | Ma et al. | |
| 2020/0372743 A1 | 11/2020 | Miller et al. | |
| 2021/0011443 A1 | 1/2021 | Mcnamara et al. | |
| 2021/0012598 A1 | 1/2021 | Giebat et al. | |
| 2021/0023248 A1 | 1/2021 | Townsend et al. | |
| 2021/0056791 A1 | 2/2021 | Shen | |
| 2021/0123287 A1 | 4/2021 | Miller et al. | |
| 2021/0134096 A1 | 5/2021 | Pukari | |
| 2021/0160230 A1 | 5/2021 | Du | |
| 2021/0192876 A1 | 6/2021 | Tikkanen et al. | |
| 2021/0217260 A1 | 7/2021 | Chen | |
| 2021/0230903 A1* | 7/2021 | Fournier | E05B 39/00 |
| 2021/0252179 A1 | 8/2021 | Grinstead et al. | |
| 2021/0308311 A1 | 10/2021 | Stewart et al. | |
| 2022/0148393 A1 | 5/2022 | Shen et al. | |
| 2022/0307316 A1 | 9/2022 | Soderqvist | |
| 2022/0389740 A1* | 12/2022 | Hoiland | E05B 9/00 |
| 2023/0104006 A1 | 4/2023 | Tien | |
| 2023/0133080 A1 | 5/2023 | Tien | |
| 2023/0374820 A1 | 11/2023 | Huang | |
| 2023/0392413 A1* | 12/2023 | Hiremath | E05B 17/22 |

FOREIGN PATENT DOCUMENTS

| | | | |
|---|---|---|---|
| DE | 102016202225 | A1 | 8/2017 |
| DE | 102017209467 | A1 | 12/2018 |
| EP | 0107151 | A1 | 5/1984 |
| EP | 1788169 | A1 | 5/2007 |
| EP | 2933415 | A1 | 10/2015 |
| EP | 3550528 | A1 | 9/2019 |
| EP | 3460149 | B1 | 11/2019 |
| EP | 3805490 | A1 | 4/2021 |
| GB | 2572027 | A | 9/2019 |
| KR | 20210019168 | A | 2/2021 |
| KR | 20210033154 | A | 3/2021 |
| WO | 8800633 | A1 | 1/1988 |
| WO | 2021007588 | A1 | 1/2021 |
| WO | 2021050616 | A1 | 3/2021 |
| WO | 2021214134 | A1 | 10/2021 |
| WO | 2022063950 | A1 | 3/2022 |
| WO | 2022063952 | A1 | 3/2022 |
| WO | 2023036744 | A1 | 3/2023 |

* cited by examiner

LOCK CAPABLE OF SHOWING LOCKING OR UNLOCKING STATE

BACKGROUND OF THE INVENTION

The present invention relates to a lock and, more particularly, to a lock capable of showing the lock is in a locking status or an unlocking status through direct visual observation.

A currently available lock is suitable for installation on a passageway door which may, e.g., permit access to a stair well between two floors of a building. A non-automatically controlled passageway door in a normal state is generally set to a normally closed state to prevent spread of fire and smoke during a fire event. A lock installed on the passageway door includes a latch device mounted on an inner side of the passageway door and an operating device mounted on an outer side of the passageway door. The latch device includes a latch engaged with a groove in a door frame when the passageway door is closed. The operating device in an unlocked state may be operated to move the latch from a latching position to an unlatching position. On the other hand, the operating device in a locked state cannot be directly operated to move the latch from the latching position to the unlatching position.

Since the operating device cannot be operated to move the latch from the latching position to the unlatching position in all conditions. In a case of, e.g., a fire event, a person on the side of the operating device still has to directly operate the operating device to assure whether the operating device is in a locked state. However, the operating device may become very hot due to the high temperature of the fire event, such that the person not aware of this situation may be scalded. Furthermore, in the emergent state of the first event, the person still has to manually operate to check whether the operating device is in the locked state. This adversely affects the speed for checking whether each passageway door is in the locked state.

BRIEF SUMMARY OF THE INVENTION

In view of the above problem, the present invention provides a lock capable of showing a locking state or an unlocking state, with the lock comprising:

a latch device including a latch and an unlatching member interlocked with the latch, wherein the latch is movable between a latching position and an unlatching position, wherein the unlatching member is independently interlocked with the latch for moving the latch from the latching position to the unlatching position, and wherein the latch device is configured to be securely mounted to a first side of a door;

a base including a window, a first engaging portion, and a second engaging portion, wherein the base is configured to be securely mounted to a second side of the door;

an operating member coupled with the second engaging portion, wherein the operating member is interlocked with the latch, and wherein the operating member is independently interlocked with the latch for moving the latch from the latching position to the unlatching position;

a locking operation mechanism coupled with the first engaging portion of the base, wherein the locking operation mechanism includes an actuating block, wherein the locking operation mechanism is lockably coupled with the operating member, wherein when the locking operation mechanism is not in an unlocked state, the actuating block is prevented from being actuated, and wherein the actuating block is actuatable when the locking operation mechanism is in the unlocked state;

an actuating member pivotably connected with the locking operation mechanism, wherein the actuating member includes a first arm and is interlocked with the actuating block;

an indicating member movably received in the base, wherein the indicating member includes a locking indication and an unlocking indication, wherein the first arm is interlocked with the indicating member, wherein when the locking operation mechanism secures the operating member in place, operation of the operating member is prevented to thereby prevent the latch from moving from the latching position to the unlatching position, and the indicating member is in a position in which the locking indication is aligned with the window, wherein when the locking operation mechanism releases the operating member, the operating member is permitted to move the latch from the latching position to the unlatching position, wherein movement of the latch from the latching position to the unlatching position causes the actuating block to actuate the actuating member to pivot, and the indicating member is pushed by the first arm to another position in which the unlocking indication is aligned with the window.

The window of the indicating member is aligned with the locking indication or the unlocking indication to enable direct visual indication of the status of the operating device (permitting or not permitting movement of the latch from the latching position to the unlatching position) without further operation. This permits rapid confirmation of whether the lock is in a locked state, which is extremely helpful in an emergent situation, such as a fire event.

In an example, the base includes a mounting hole and a frame coupled with the mounting hole. The first engaging portion is located between the mounting hole and the second engaging portion, wherein the frame includes a receiving groove. The window is located on a face of the frame and intercommunicates with the receiving groove. The indicating member is movably received in the receiving groove.

In an example, the indicating member further includes an unlocking wall adjacent to the locking indication and a locking wall adjacent to the unlocking indication and spaced from the unlocking wall. A notch is formed between the locking wall and the unlocking wall. The first arm of the actuating member extends through the notch and is located between the locking wall and the unlocking wall.

In an example, the lock further comprises a side cover. The frame includes a flange adjacent to a side of the window and an extension portion extending from the flange. The receiving groove is on an inner side of the extension portion. The frame further includes a sidewall. The mounting hole is formed on the sidewall and includes a first portion and a second portion. The first portion extends from an outer surface of the sidewall towards but spaced from an inner surface of the sidewall. The second portion extends from the inner surface of the sidewall to the first portion. A cross sectional area of the first portion is greater than a cross sectional area of the second portion. The flange of the frame is coupled with the first portion and is exposed to the outer surface. The extension portion extends through the second portion to an inner spaced delimited by the base. The side cover is securely disposed on the extension portion of the frame. The side cover includes two ends abutting the inner surface of the sidewall.

In an example, the lock further comprises:

an activating member coupled with the operating member to rotate therewith and received in the base;

a sliding member movably received in the base, wherein pivotal movement of the activating member causes displacement of the sliding member;

a driving member coupled with the sliding member to move therewith, wherein the driving member is interlocked with the latch;

a limiting member pivotably received in the bae, wherein the activating member further includes a second arm and a third arm, wherein the limiting member is interlocked with the third arm, and wherein the second arm is interlocked with the actuating block, wherein when the locking operation mechanism is in the unlocked state, the actuating block is pivotable to press against the second arm to thereby pivot the actuating member, the first arm pushes the indicating member to displace, the third arm pushes the limiting member to pivot between a stop position and a non-stop position, wherein when the locking operation mechanism secures the operating member in place, the limiting member is in the stop position, the sliding member is stopped by the limiting member to thereby prevent pivotal movement of the activating member and the operating member, wherein when the locking operation mechanism releases the operating member, the limiting member is in the non-stop position, the sliding member is spaced from the limiting member and is displaceable to permit pivotal movement of the activating member and the operating member.

The actuating member cooperates with the locking operation mechanism to achieve synchronous interlocking with the indicating member and the limiting member, thereby permitting smooth locking operation (to prevent rotation of the operating member) and unlocking operation (to permit rotation of the operating member).

In another aspect, the present invention provides a lock capable of showing a locking state or an unlocking state, with the lock comprising:

a latch device including a latch movable between a latching position and an unlatching position;

an operating device interlocked with the latch device, wherein the operating device includes a base and an indicating member movably coupled with the base, wherein the base includes a window, wherein the indicating member includes a locking indication and an unlocking indication, wherein the operating device further includes an operating member and a driving member interlocked with the latch and the operating member, wherein operation of the driving member causes movement of the latch from the latching position to the unlatching position, wherein the operating device further includes a limiting member configured to restrict movement of the driving member and a locking operation mechanism, wherein each of the locking operation mechanism, the indicating member, and the limiting member is interlocked with an actuating member, wherein operation of the locking operation mechanism causes pivotal movement of the actuating member which actuates the indicating member to pivot the limiting member to a stop position or a non-stop position, wherein when the limiting member is in the stop position, operation of the driving member and the operating member is prevented, and the locking indication of the indicating member is aligned with the window, and wherein when the limiting member is in the non-stop position, operation of the driving member and the operating member is permitted, and the unlocking indication of the indicating member is aligned with the window.

The window of the indicating member is aligned with the locking indication or the unlocking indication to enable direct visual indication of the status of the operating device (permitting or not permitting movement of the latch from the latching position to the unlatching position) without further operation. This permits rapid confirmation of whether the lock is in a locked state, which is extremely helpful in an emergent situation, such as a fire event.

In an example, the actuating member includes a first arm, a second arm, and a third arm. The locking operation mechanism includes a lock core and an actuating block coupled with the lock core to rotate therewith. The first arm is interlocked with the indicating member. The third arm is interlocked with the limiting member. The second arm is interlocked with the actuating block. When the lock core is in an unlocked state, rotation of the actuating block is prevented. When the lock core is in the unlocked state, the actuating block is rotatable to press against the second arm, such that the first arm actuates the indicating member to displace, and the third arm actuates the limiting member to pivot.

In an example, the base includes a mounting hole and a frame coupled with the mounting hole. The frame includes a receiving groove. The window is on an end face of the frame and intercommunicates with the receiving groove. The indicating member is movably received in the receiving groove.

In an example, the lock further comprises a side cover. The frame includes a flange adjacent to the window and an extension portion extending from the flange. The frame further includes a sidewall. The mounting hole is formed on the sidewall and includes a first portion and a second portion. The first portion extends from an outer surface of the sidewall towards but spaced from an inner surface of the sidewall. The second portion extends from the inner surface of the sidewall to the first portion. A cross sectional area of the first portion is greater than a cross sectional area of the second portion. The flange of the frame is coupled with the first portion and is exposed to the outer surface. The extension portion extends through the second portion to an inner space delimited by the base. The side cover is securely disposed on the extension portion of the frame. The side cover includes two ends abutting the inner surface of the sidewall.

The present invention will become clearer in light of the following detailed description of illustrative embodiments of this invention described in connection with the drawings.

Figure 1:
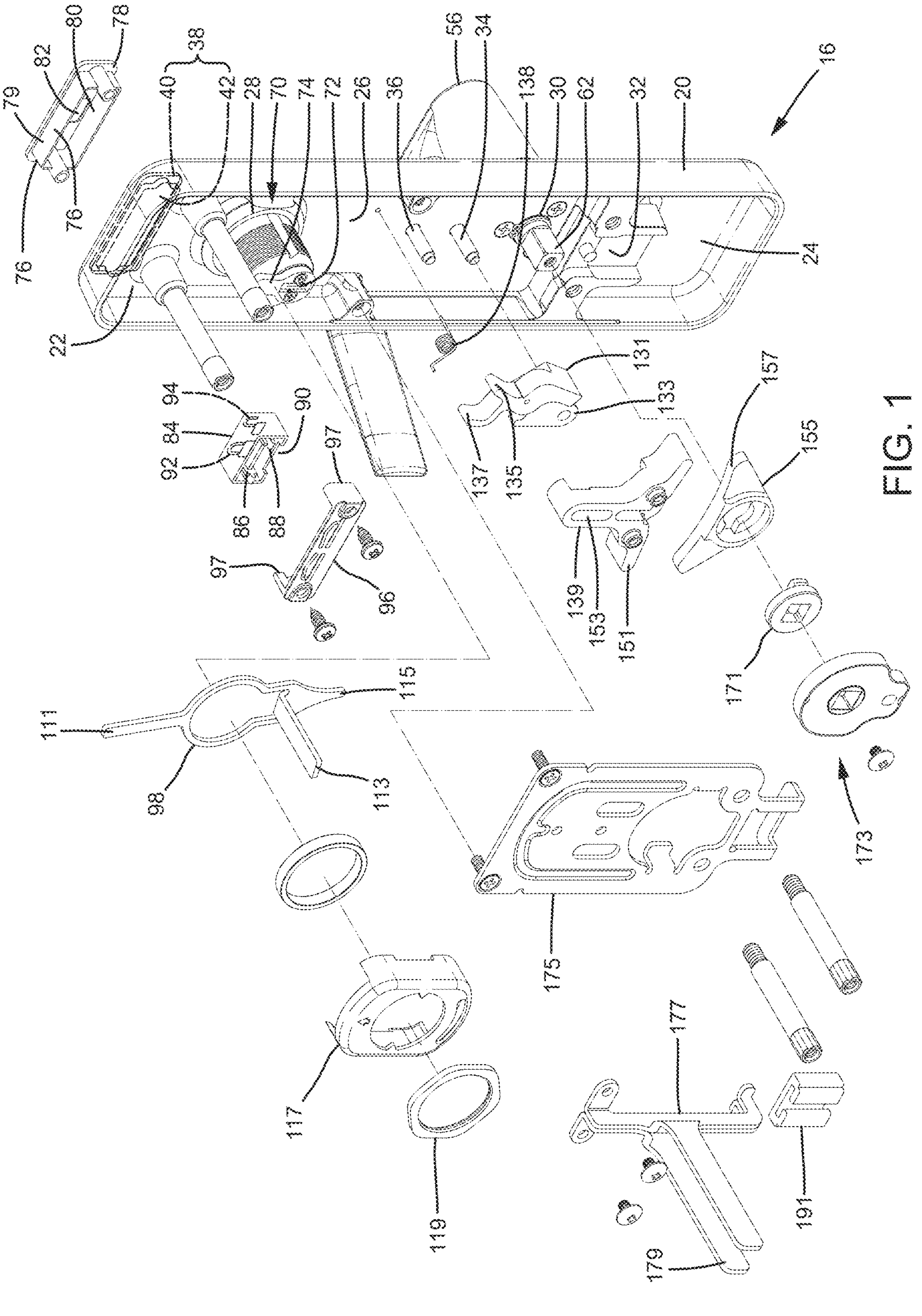
FIG. 1 is an exploded, perspective view of an operating device of a lock of an embodiment according to the present invention.
Figure 2:
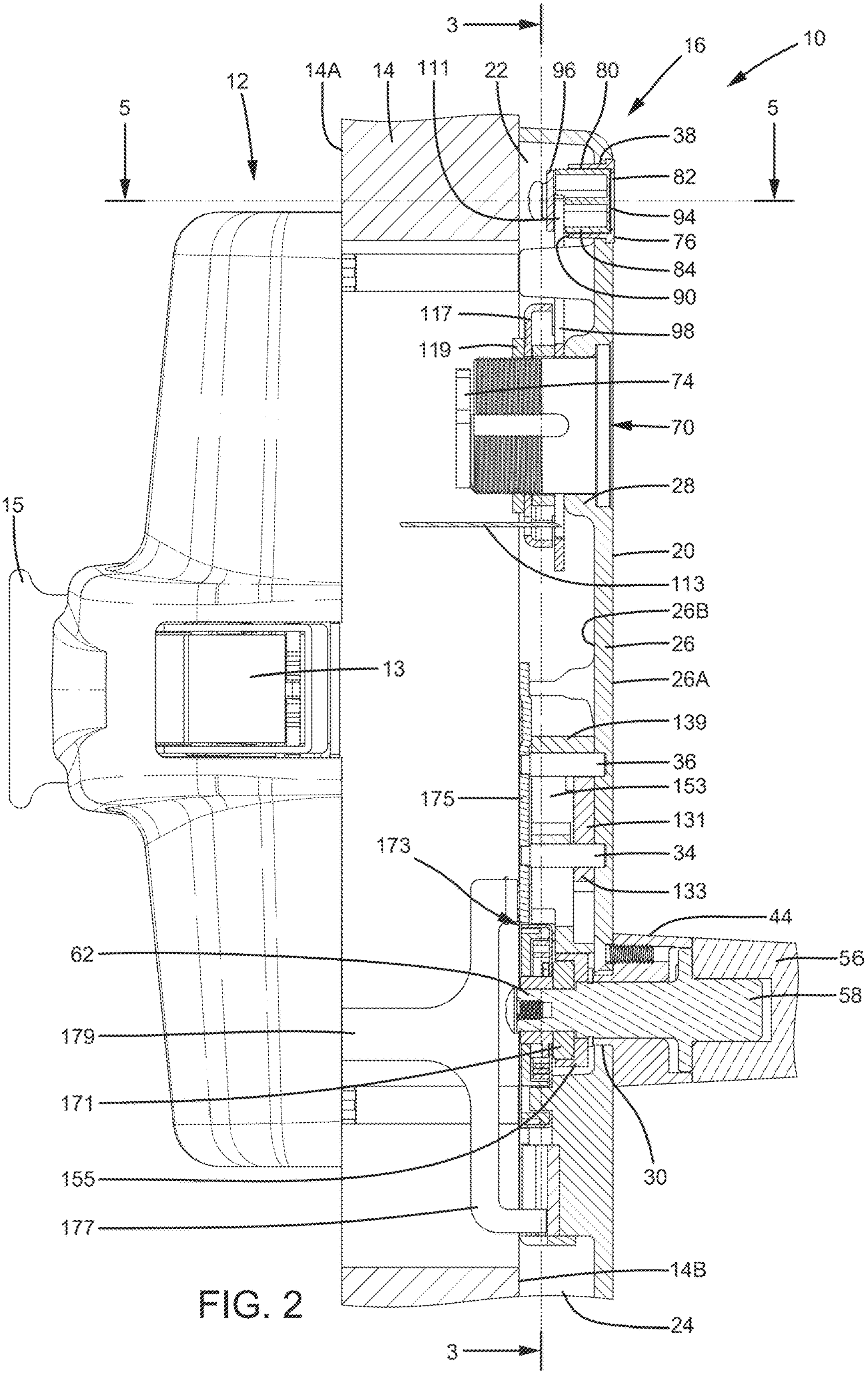
FIG. 2 a cross sectional view illustrating installation of the operating device and a latch device of the lock on a door.
Figure 3:
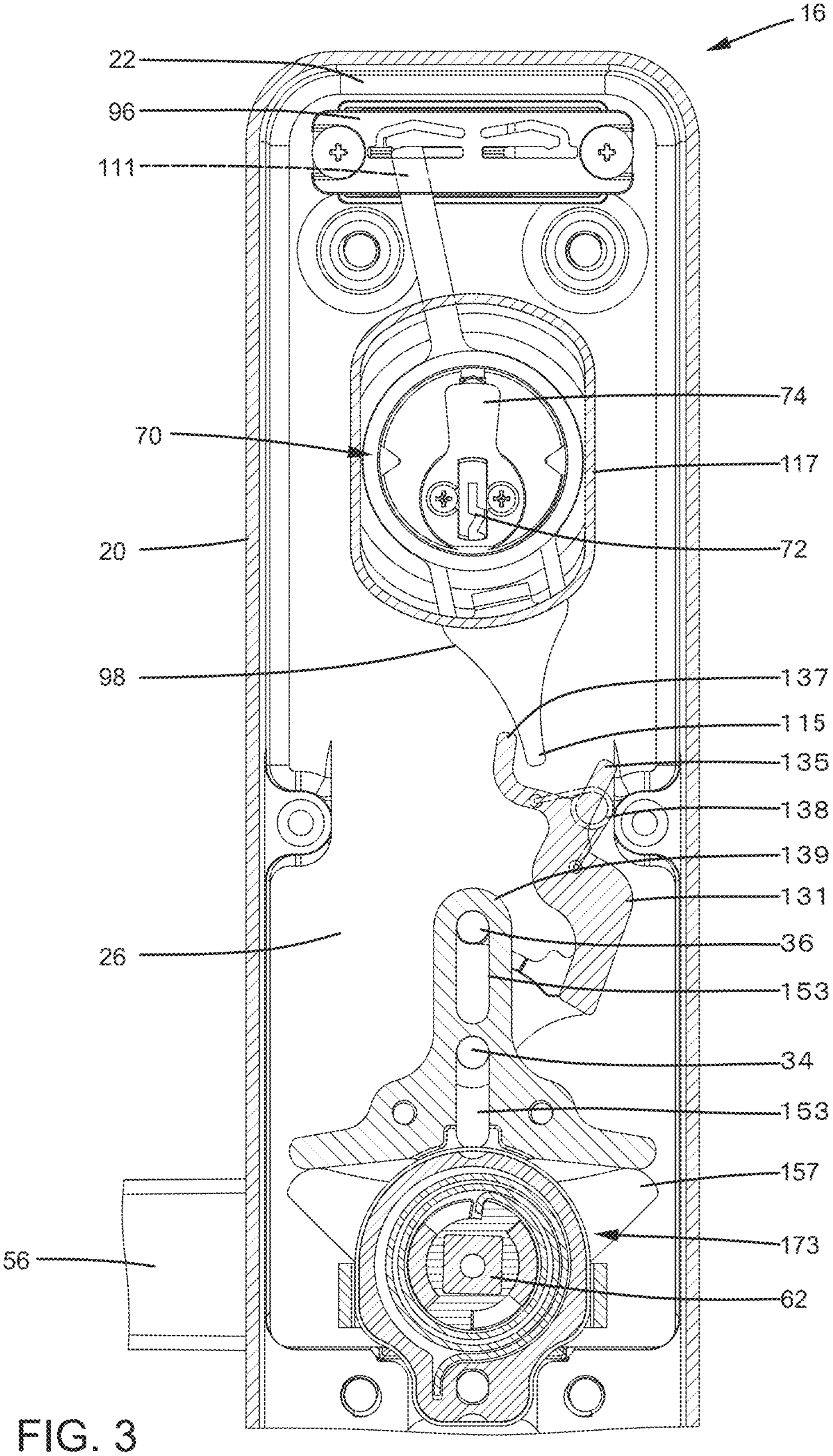
FIG. 3 is a cross sectional view taken along section line 3-3 of FIG. 2.
Figure 4:
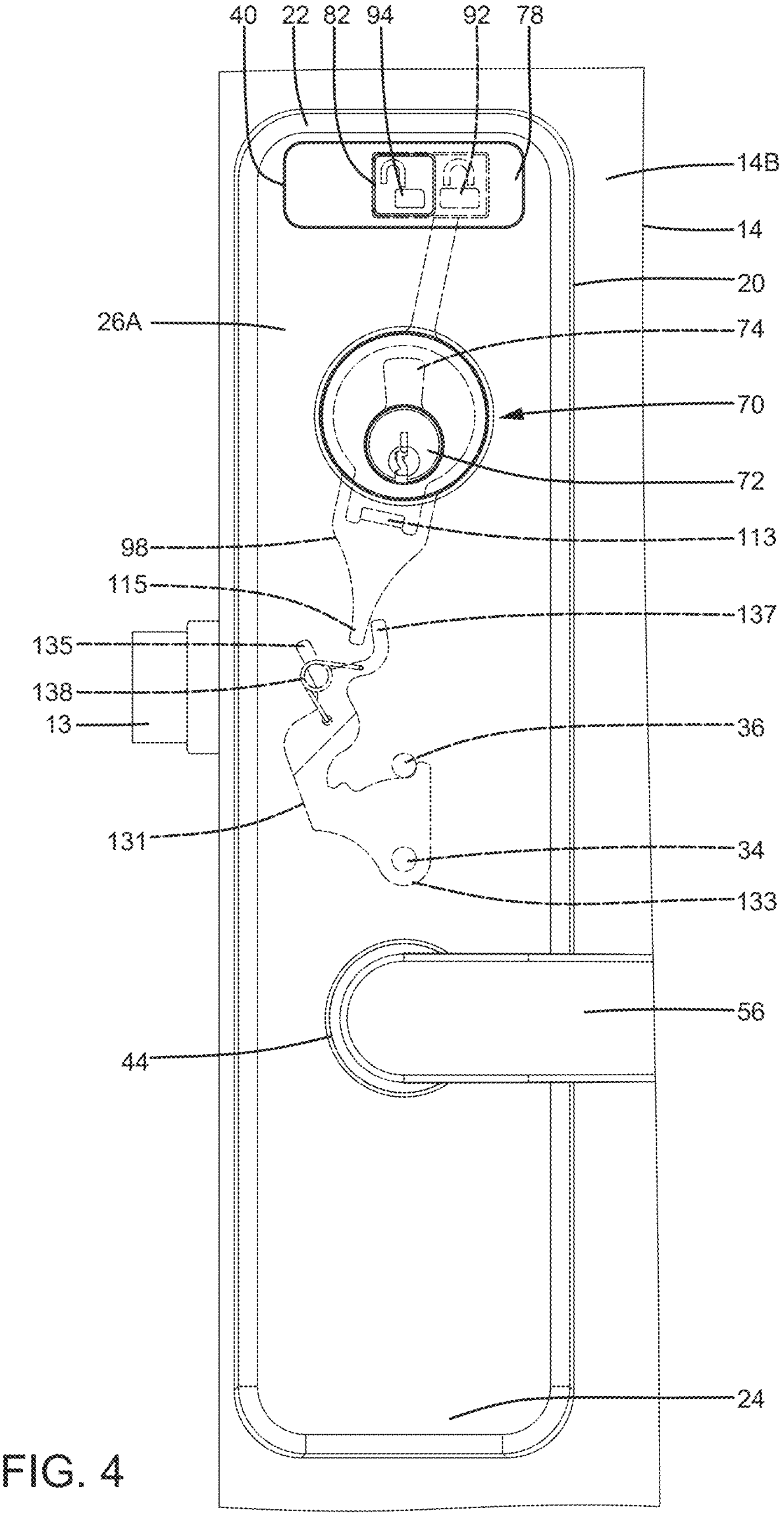
FIG. 4 is a right side view of the arrangement shown in FIG. 3.

All figures are drawn for ease of explanation of the basic teachings of the present invention only; the extensions of the figures with respect to number, position, relationship, and dimensions of the parts to form the embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "third", "lower", "upper", "inner", "outer", "side", "end", "portion", "section", "horizontal", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

With reference to FIGS. 1-4, a lock 10 of an embodiment according to the present invention is mounted on a door 14 including a first side 14A and a second side 14B opposite to the first side 14A. The lock 10 comprises a latch device 12 securely mounted on the first side 14A and an operating device 16 securely mounted on the second side 14B.

The latch device 12 includes a latch 13 and an unlatching member 15 interlocked with the latch 13. The latch 13 is movable between a latching position engaged with a groove in a door frame (not shown) and an unlatching position (not shown) disengaged from the door frame. When the unlatching member 15 is operated, the latch 13 can be moved from the latching position to the unlatching position, which is conventional. According to the form shown, the latch device 12 is suitable for a door passageway lock.

The operating device 16 includes a base 20 having an upper end 22 and a lower end 24. The base 20 further includes a sidewall 26 extending between the upper end 22 and the lower end 24. The sidewall 26 includes an outer surface 26A and an inner surface 26B opposite to the inner surface 26A. The sidewall 26 of the base 20 includes a first engaging portion 28, a second engaging portion 30, and a third engaging portion 32. The sidewall 26 of the base 20 further includes a mounting hole 38. The mounting hole 38 includes a first portion 40 extending from the outer surface 26A toward but spaced from the inner surface 26B and a second portion 42 extending from the inner surface 26B to the first portion 40. A cross sectional area of the first portion 40 is slightly greater than a cross sectional area of the second portion 42 (see FIG. 5). The base 20 further includes first and second guiding rods 34 and 36 protruding from the inner surface 26B of the sidewall 26.

The mounting hole 38 is located on the upper end 22 of the base 20. The first engaging portion 28 is located between the mounting hole 38 and the second guiding rod 36. The second guiding rod 36 is located between the first engaging portion 28 and the first guiding rod 34. The first guiding rod 34 is located between the second guiding rod 36 and the second engaging portion 30. The second engaging portion 30 is located between the first guiding rod 34 and the third engaging portion 32. The third engaging portion 32 is located between the second engaging portion 30 and the lower end 24 of the base 20.

The base 20 abuts the second side 14B of the door 14. The inner surface 26B of the sidewall 26 faces and is spaced from the second side 14B of the door 14. A plurality of screws is provided to tightly fix the base 20 and the latch device 12 on the first side 14A and the second side 14B of the door 14, respectively.

The base 20 further includes a frame 76. The frame 76 includes a flange 78 and an extension portion 79 protruding from an end face of the flange 78. The extension portion 79 defines a receiving groove 80. The frame 76 includes a window 82 extending from an outer surface of the frame 76 to the receiving groove 80. The flange 78 of the frame 76 is coupled with the first portion 40 of the mounting hole 38. The extension portion 79 extends through the second portion 42 to an inner space delimited by the base 20. Thus, the window 82 is exposed to the outer surface 26A of the sidewall 28, whereas the receiving groove 80 is on the inner side of the sidewall 26.

The operating device 16 further includes an indicating member 84 movably received in the base 20 and a side cover 96 received in the base 20. The indicating member 84 includes an unlocking indication 94 on an outer surface thereof and a locking indication 92 on the outer surface thereof. Both the unlocking indication 94 and the locking indication 92 may be but not limited to be comprised of a figure or a pattern. The indicating member 84 further includes an unlocking wall 86 adjacent to the locking indication 92 and a locking wall 88 adjacent to the unlocking indication 94. The indicating member 84 further includes a notch 90 between the locking wall 88 and the unlocking wall 86. The indicating member 84 is received in the receiving groove 80 and is movable between a position in which the locking indication 92 is aligned with the window 80 and another positon in which the unlocking indication 94 is aligned with the window 82.

Figure 5:
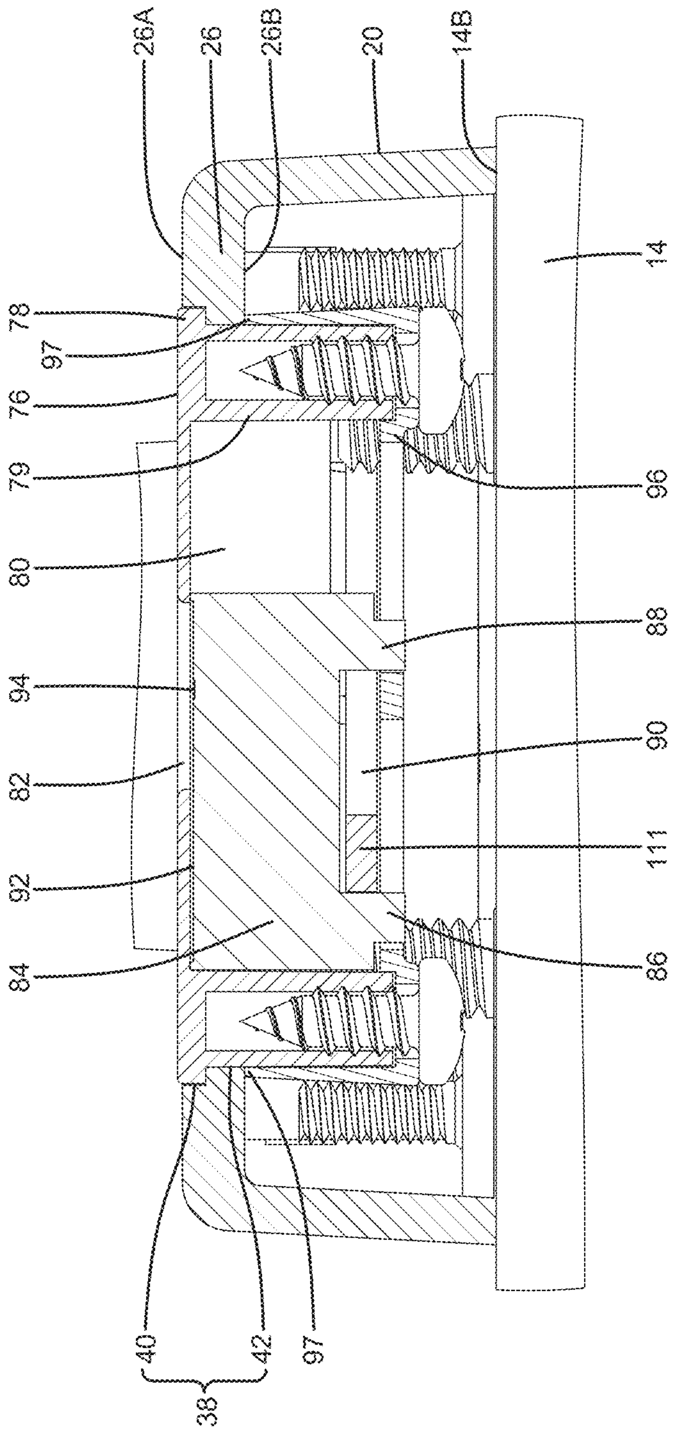
FIG. 5 is a cross sectional view taken along section line 5-5 of FIG. 2.

With reference to FIG. 5, the side cover 96 includes two end portions 97 and is securely coupled with the extension portion 79 of the frame 76. The two end portions 97 abut the inner surface 26B of the sidewall 26 to prevent the frame 76 from disengaging from the mounting hole 38. Furthermore, the indicating member 84 is located between the frame 76 and the side cover 96.

A locking operation mechanism 70 is securely mounted on the first engaging portion 28 of the base 20. According to the form shown, the locking operation mechanism 70 includes a lock core 72 and an actuating block 74 coupled to the lock core 72 to rotate therewith. The lock core 72 can be rotated by inserting a correct key into the lock core 72 and then rotate the key. When the correct key is disengaged from the lock core 72 or an incorrect key is used, the lock core 72 cannot be rotated. The actuating block 74 of the locking operation mechanism 70 and the inner surface 26B of the sidewall 26 are on the same side.

The operating device 16 includes an actuating member 98 pivotably coupled with the locking operation mechanism 70, a cover 117, and a locking ring 119. The locking operation mechanism 70 includes a first arm 111, a second arm 113, and a third arm 115. The first arm 111 is spaced from the third arm 115 by 180° about a pivotal axis of the actuating member 98. The second arm 113 is located between the first arm 111 and the third arm 115. The first arm 111 extends through the notch 90 of the indicating member 84 and is located between the locking wall 86 and the unlocking wall 88. Furthermore, the first arm 111 is located between the side cover 96 and the indicating member 84.

The cover 117 is disposed on the outer side of the locking operation mechanism 70. The first arm 111 and the third arm 115 of the actuating member 98 are located between the side cover 117 and the first engaging portion 28. The locking ring 119 is in threading connection with the locking operation mechanism 70 and abuts the cover 117. The first, second, and third arms 111, 113, and 115 extend beyond the cover 117. Furthermore, the second arm 113 is located on a rotational path of the actuating block 74 of the locking operation mechanism 70. Thus, when the actuating block 74 rotates, the actuating member 98 is interlocked to rotate.

Figure 6:
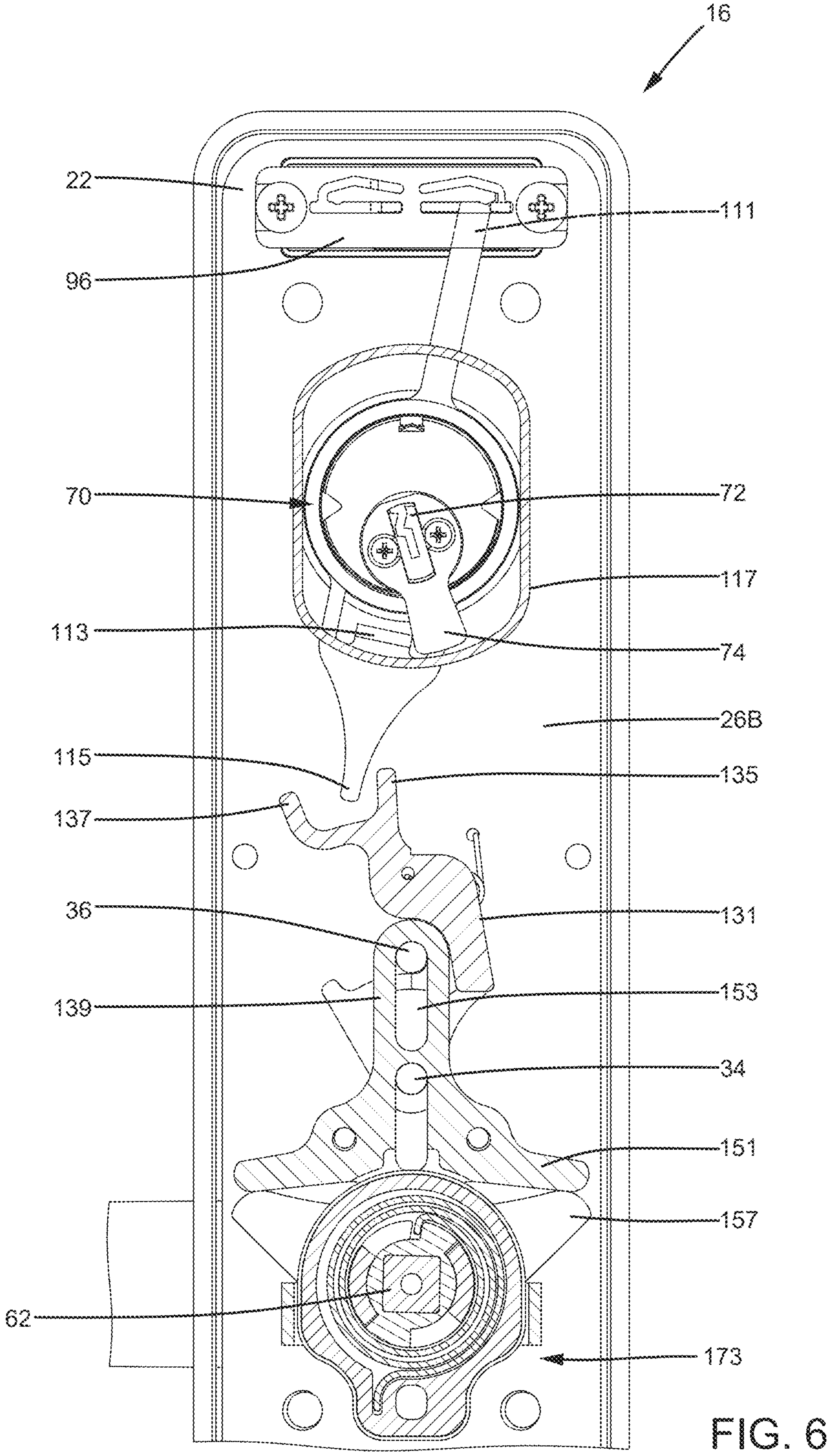
FIG. 6 is a view similar to FIG. 3 with the operating device in the locked state.
Figure 7:
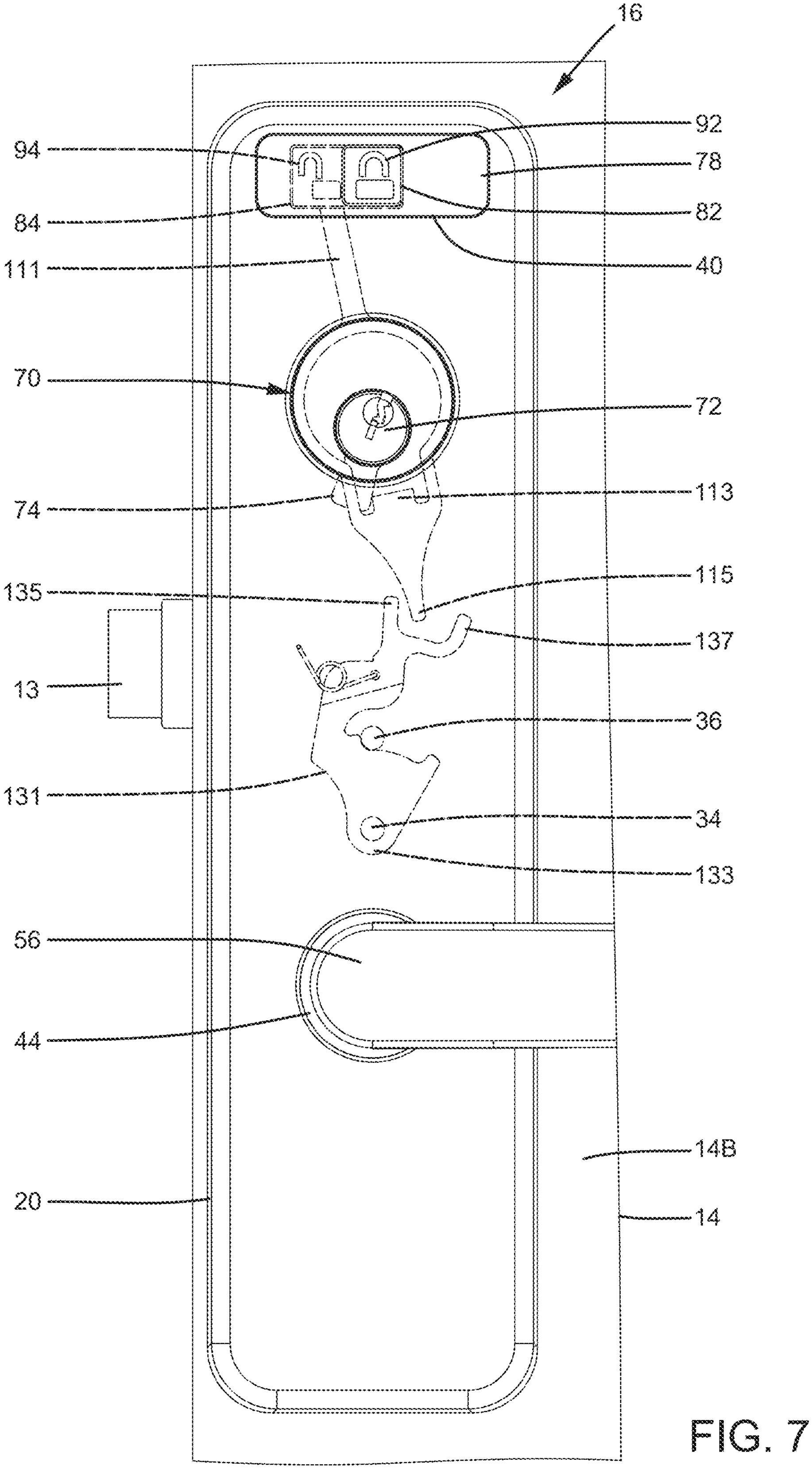
FIG. 7 is a view similar to FIG. 4 with the operating device in the locked state.

The operating device 16 further includes a limiting member 131 pivotably received in the base 20 and a sliding member 139 slidably received in the base 20. The limiting member 131 includes a pivotal portion 133 and first and second protrusions 135 and 137 protruding from the pivotal portion 133. The pivotal portion 133 of the limiting member 131 is pivotably coupled with the first guiding rod 34 and abuts the inner surface 26B of the sidewall 26. The third arm 115 of the actuating member 98 is located between the first protrusion 135 and the second protrusion 137. Thus, the actuating block 74 of the locking operation mechanism 70, the indicating member 84, and the limiting member 131 are interlocked with the actuating member 98. Therefore, when the actuating member 98 pivots, the third arm 115 pushes the limiting member 131 to pivot between a stop position (FIG. 6) and a non-stop position (FIG. 3), and the first arm 111 also actuates the indicating member 84 to displace.

A biasing spring 138 is disposed between the limiting member 131 and the base 20. The biasing member 138 is used to bias the limiting member 131 to the stop position or the non-stop position.

The sliding member 139 includes two sliding grooves 153 and an abutting portion 151 outside of the two sliding grooves 153. The sliding member 139 is slidably received in the base 20. The first guiding rod 34 and the second guiding rod 36 are received in the two sliding grooves 153 of the sliding member 139 to guide sliding movement of the sliding member 139.

The operating device 16 further includes an operating member 56 and a pivotal connection seat 44. The pivotal connection seat 44 is securely coupled with the second engaging portion 30 and is located on the outer surface 26A of the sidewall 26. The operating member 56 includes a shank 58 having a distal end with a coupling portion 56 having non-circular cross sections. The shank 58 of the operating member 56 is pivotably coupled with the pivotal connection seat 44 and has an outer end extending beyond the outer surface 26A. The coupling portion 62 of the shank 58 extends through the pivotal connection portion 44 to the inner side of the sidewall 26.

The operating member 56 is coupled with an activating member 155 to rotate therewith. The activating member 155 includes a lug 157 and is securely mounted around the coupling portion 62 of the shank 58. Each of the activating member 155 and the coupling portion 62 is coupled with an interlocking member 171 to rotate therewith. The lug 157 of the activating member 155 abuts a lower side of the abutting portion 151 of the sliding member 139. Thus, when the operating member 56 pivots, the activating member 155 actuates the sliding member 139 to displace.

A returning device 173 is securely mounted on the third engaging portion 32 of the base 20. The coupling portion 56 of the operating member 56 is interlocked with the returning device 173. The returning device 173 includes a spiral spring to bias the operating member 56 to an initial position. The operating member 56 may be but not limited to a lever handle. The returning device 173 is used to bias the L-shaped operating member 56 to the initial position (a horizontal position) substantially parallel to the ground.

An inner cover 175 is securely mounted to a side of the base 20, such that the limiting member 131, the sliding member 139, the activating member 155, the interlocking member 171, and the returning device 173 are located between the inner cover 175 and the sidewall 26.

The operating device 16 further includes a driving member 177 interlocked with the operating member 56 and the latch 13 of the latch device 12. The driving member 177 is substantially located on an outer side of the inner cover 175 and is coupled with the sliding member 139 to move therewith. The driving member 177 includes a push rod 179 extending into the latch device 12 to securely couple with the latch 13, thereby permitting joint movement of the push rod 179 and the latch 13. A guiding block 191 is disposed on the third engaging portion 32 of the base 20. The driving member 177 is slidably coupled with the guiding block 191. When the operating member 56 pivots, the push rod 179 of the driving member 177 displaces to move the latch 13 from the latching position to the unlatching position.

Now that the basic construction of the lock 10 of the present invention has been explained, the operation and some of the advantages of the lock 10 according to the present invention can be set forth and appreciated. In particular, for the sake of explanation, it will be assumed that the limiting member 131 of the operating device 16 is in the non-stop position (see FIGS. 3 and 4). The indicating member 84 is in a position in which the unlocking indication 94 is aligned with the window 82, such that a person may directly see the unlocking indication 94 from the outer side of the operating device 16. Thus, the person is aware of that the operating device 16 may actuate the latch 13 to move from the latching position to the unlatching position.

With the limiting member 131 in the non-stop position, when the operating member 56 is pivoted, the activating member 155 pivots and pushes the sliding member 139 and the driving member 177 to move toward the upper end 22 of the base 20, whereas the driving member 177 interlocks with the mechanism of the latch device 12 to move the latch 13 from the latching position to the unlatching position, thereby permitting opening of the door 14.

With reference to FIGS. 3, 4, 6, and 7, with the limiting member 131 in the non-stop position, when a correct key is used to unlock the locking operation mechanism 70 to thereby rotate the actuating block 74 in a direction, the actuating block 74 pushes the third arm 113 of the actuating member 98, such that the third arm 115 presses against the second protrusion 137 to pivot the limiting member 131 from the non-stop position to the stop position. At the same time, the first arm 111 pushes the locking wall 88 of the indicating member 84, such that the indicating member 84 moves to a position in which the locking indication 92 is aligned with the window 82 (see FIG. 7). When the limiting member 131 is in the stop position, the limiting member 131 is on the movement path of the sliding member 139, such that the sliding member 139 is not movable as being stopped by the limiting member 131. As a result, the driving member 177, the activating member 155, and the operating member 56 cannot be operated. Accordingly, the latch 13 cannot be actuated by the driving member 177 and, thus, cannot move from the latching position to the unlatching position.

With the limiting member 131 in the non-stop position, when a correct key is used to unlock the locking operation mechanism 70 to thereby rotate the actuating block 74 in a reverse direction, the actuating block 74 pushes the third arm 113 of the actuating member 98, such that the third arm 115 presses against the first protrusion 135 to pivot the limiting member 131 from the stop position to the non-stop position. At the same time, the first arm 111 pushes the unlocking wall 86 of the indicating member 84, such that the indicating member 84 moves to another position in which the unlocking indication 94 is aligned with the window 82 (see FIG. 4). When the limiting member 131 is in the non-stop position, the limiting member 131 is outside of the movement path of the sliding member 139, such that the sliding member 139 is not stopped by the limiting member 131. As a result, the driving member 177, the activating member 155, and the operating member 56 can be operated. Accordingly, the latch 13 can be actuated by the driving member 177 to move from the latching position to the unlatching position.

As can be appreciated from the technical features and associated operations of the lock 10 according to the present invention, the lock 10 according to the present invention includes at least the following advantages. For example, the window 82 of the indicating member 84 is aligned with the locking indication 94 or the unlocking indication 92 to enable direct visual indication of the status of the operating device 16 (permitting or not permitting movement of the latch 13 from the latching position to the unlatching position) without further operation. This permits rapid confirmation of whether the lock 10 is in a locked state, which is extremely helpful in an emergent situation, such as a fire event.

The actuating member 98 cooperates with the locking operation mechanism 70 to achieve synchronous interlocking with the indicating member 84 and the limiting member 131, thereby permitting smooth locking operation (to prevent rotation of the operating member 56) and unlocking operation (to permit rotation of the operating member 56).

Now that the basic teachings of the present invention have been explained, many extensions and variations will be obvious to one having ordinary skill in the art. For example, the locking operation mechanism 70 may have a mechanism without using a key for unlocking operation. For example, the locking operation mechanism 70 may be an electronically driven mechanism, and when the operating device 16 receives a correct wireless signal, power is supplied to rotate the actuating block 74 to thereby displace the indicating member 84 and pivot the limiting member 131, achieving the same function desired by the present invention.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A lock capable of showing a locking state or an unlocking state, with the lock comprising:

a latch device including a latch and an unlatching member interlocked with the latch, wherein the latch is movable between a latching position and an unlatching position, wherein the unlatching member is interlocked with the latch for moving the latch from the latching position to the unlatching position, and wherein the latch device is configured to be securely mounted to a first side of a door;

a base including a window, a first engaging portion, and a second engaging portion, wherein the base is configured to be securely mounted to a second side of the door;

an operating member coupled with the second engaging portion, wherein the operating member is interlocked with the latch, and wherein the operating member is interlocked with the latch for moving the latch from the latching position to the unlatching position;

a locking operation mechanism coupled with the first engaging portion of the base, wherein the locking operation mechanism includes an actuating block, wherein the locking operation mechanism is lockably coupled with the operating member, wherein when the locking operation mechanism is not in an unlocked state, the actuating block is prevented from being actuated, and wherein the actuating block is actuatable when the locking operation mechanism is in the unlocked state;

an actuating member pivotably connected with the locking operation mechanism, wherein the actuating member includes a first arm and is interlocked with the actuating block;

an indicating member movably received in the base, wherein the indicating member includes a locking indication and an unlocking indication, wherein the first arm is interlocked with the indicating member, wherein when the locking operation mechanism secures the operating member in place, operation of the operating member is prevented to thereby prevent the latch from moving from the latching position to the unlatching position, and the indicating member is in a position in which the locking indication is aligned with the window, wherein when the locking operation mechanism releases the operating member, the operating member is permitted to move the latch from the latching position to the unlatching position, wherein movement of the latch from the latching position to the unlatching position causes the actuating block to actuate the actuating member to pivot, and the indicating member is pushed by the first arm to another position in which the unlocking indication is aligned with the window.

2. The lock capable of showing the locking state or the unlocking state as claimed in claim 1, wherein the base includes a mounting hole and a frame coupled with the mounting hole, wherein the first engaging portion is located between the mounting hole and the second engaging portion, wherein the frame includes a receiving groove, wherein the window is located on a face of the frame and intercommunicates with the receiving groove, and wherein the indicating member is movably received in the receiving groove.

3. The lock capable of showing the locking state or the unlocking state as claimed in claim 2, wherein the indicating member further includes an unlocking wall adjacent to the locking indication and a locking wall adjacent to the unlocking indication and spaced from the unlocking wall, wherein a notch is formed between the locking wall and the unlocking wall, and wherein the first arm of the actuating member extends through the notch and is located between the locking wall and the unlocking wall.

4. The lock capable of showing the locking state or the unlocking state as claimed in claim 2, further comprising a side cover, wherein the frame includes a flange adjacent to a side of the window and an extension portion extending from the flange, wherein the receiving groove is on an inner side of the extension portion, wherein the frame further includes a sidewall, wherein the mounting hole is formed on the sidewall and includes a first portion and a second portion, wherein the first portion extends from an outer surface of the sidewall towards but spaced from an inner surface of the sidewall, wherein the second portion extends from the inner surface of the sidewall to the first portion, wherein a cross sectional area of the first portion is greater than a cross sectional area of the second portion, wherein the flange of the frame is coupled with the first portion and is exposed to the outer surface, wherein the extension portion extends through the second portion to an inner spaced delimited by the base, wherein the side cover is securely disposed on the extension portion of the frame, and wherein the side cover includes two ends abutting the inner surface of the sidewall.

5. The lock capable of showing the locking state or the unlocking state as claimed in claim 1, further comprising:

an activating member coupled with the operating member to rotate therewith and received in the base;

a sliding member movably received in the base, wherein pivotal movement of the activating member causes displacement of the sliding member;

a driving member coupled with the sliding member to move therewith, wherein the driving member is interlocked with the latch;

a limiting member pivotably received in the bae, wherein the activating member further includes a second arm and a third arm, wherein the limiting member is interlocked with the third arm, and wherein the second arm is interlocked with the actuating block, wherein when the locking operation mechanism is in the unlocked state, the actuating block is pivotable to press against the second arm to thereby pivot the actuating member, the first arm pushes the indicating member to displace, the third arm pushes the limiting member to pivot between a stop position and a non-stop position, wherein when the locking operation mechanism secures the operating member in place, the limiting member is in the stop position, the sliding member is stopped by the limiting member to thereby prevent pivotal movement of the activating member and the operating member, wherein when the locking operation mechanism releases the operating member, the limiting member is in the non-stop position, the sliding member is spaced from the limiting member and is displaceable to permit pivotal movement of the activating member and the operating member.

6. A lock capable of showing a locking state or an unlocking state, with the lock comprising:

a latch device including a latch movable between a latching position and an unlatching position;

an operating device interlocked with the latch device, wherein the operating device includes a base and an indicating member movably coupled with the base, wherein the base includes a window, wherein the indicating member includes a locking indication and an unlocking indication, wherein the operating device further includes an operating member and a driving member interlocked with the latch and the operating member, wherein operation of the driving member causes movement of the latch from the latching position to the unlatching position, wherein the operating device further includes a limiting member configured to restrict movement of the driving member and a locking operation mechanism, wherein each of the locking operation mechanism, the indicating member, and the limiting member is interlocked with an actuating member, wherein operation of the locking operation mechanism causes pivotal movement of the actuating member which actuates the indicating member to pivot the limiting member to a stop position or a non-stop position, wherein when the limiting member is in the stop position, operation of the driving member and the operating member is prevented, and the locking indication of the indicating member is aligned with the window, and wherein when the limiting member is in the non-stop position, operation of the driving member and the operating member is permitted, and the unlocking indication of the indicating member is aligned with the window.

7. The lock capable of showing the locking state or the unlocking state as claimed in claim 6, wherein the actuating member includes a first arm, a second arm, and a third arm, wherein the locking operation mechanism includes a lock core and an actuating block coupled with the lock core to rotate therewith, wherein the first arm is interlocked with the indicating member, wherein the third arm is interlocked with the limiting member, wherein the second arm is interlocked with the actuating block, wherein when the lock core is in an unlocked state, rotation of the actuating block is prevented, and wherein when the lock core is in the unlocked state, the actuating block is rotatable to press against the second arm, such that the first arm actuates the indicating member to displace, and the third arm actuates the limiting member to pivot.

8. The lock capable of showing the locking state or the unlocking state as claimed in claim 6, wherein the base includes a mounting hole and a frame coupled with the mounting hole, wherein the frame includes a receiving groove, wherein the window is on an end face of the frame and intercommunicates with the receiving groove, and wherein the indicating member is movably received in the receiving groove.

9. The lock capable of showing the locking state or the unlocking state as claimed in claim 8, further comprising a side cover, wherein the frame includes a flange adjacent to the window and an extension portion extending from the flange, wherein the frame further includes a sidewall, wherein the mounting hole is formed on the sidewall and includes a first portion and a second portion, wherein the first portion extends from an outer surface of the sidewall towards but spaced from an inner surface of the sidewall, wherein the second portion extends from the inner surface of the sidewall to the first portion, wherein a cross sectional area of the first portion is greater than a cross sectional area of the second portion, wherein the flange of the frame is coupled with the first portion and is exposed to the outer surface, wherein the extension portion extends through the second portion to an inner space delimited by the base, wherein the side cover is securely disposed on the extension portion of the frame, and wherein the side cover includes two ends abutting the inner surface of the sidewall.

* * * * *